US008744754B2

(12) United States Patent
Kappeler et al.

(10) Patent No.: US 8,744,754 B2

(45) Date of Patent: Jun. 3, 2014

(54) USER GUIDANCE WITH MOBILE ELECTRONIC DEVICES

(75) Inventors: Markus Kappeler, Winterthur (CH); Paul Friedli, Remetschwil (CH)

(73) Assignee: Inventio AG, Hergiswil NW (CH)

( * ) Notice: Subject to any disclaimer, the term of this patent is extended or adjusted under 35 U.S.C. 154(b) by 91 days.

(21) Appl. No.: 13/433,180

(22) Filed: Mar. 28, 2012

(65) Prior Publication Data

US 2012/0253658 A1 Oct. 4, 2012

(30) Foreign Application Priority Data

Mar. 29, 2011 (EP) .................................... 11160164

(51) Int. Cl.
*G01F 1/00* (2006.01)

(52) U.S. Cl.
USPC .......................................... 701/410; 187/391

(58) Field of Classification Search
USPC .......... 701/410, 409; 187/396, 391, 397, 392, 187/380, 247, 394, 316, 409, 313
See application file for complete search history.

(56) References Cited

U.S. PATENT DOCUMENTS

| | | | | |
|---|---|---|---|---|
| 5,842,145 | A | 11/1998 | Zimmer | |
| 5,959,575 | A | 9/1999 | Abbott | |
| 6,014,090 | A | 1/2000 | Rosen et al. | |
| 6,109,396 | A | 8/2000 | Sirag et al. | |
| 7,377,364 | B2 * | 5/2008 | Tyni et al. | 187/380 |
| 7,505,849 | B2 | 3/2009 | Saarikivi | |
| 7,693,757 | B2 | 4/2010 | Zimmerman | |
| 7,991,576 | B2 | 8/2011 | Roumeliotis | |
| 2002/0077749 | A1 | 6/2002 | Doi | |
| 2004/0010368 | A1 | 1/2004 | Scott | |
| 2004/0060777 | A1 | 4/2004 | Takeuchi | |
| 2006/0135183 | A1 | 6/2006 | Zavada et al. | |
| 2006/0144644 | A1 | 7/2006 | Chiba | |
| 2006/0188230 | A1 | 8/2006 | An | |
| 2009/0014516 | A1 * | 1/2009 | Kshirsagar et al. | 235/382.5 |
| 2009/0303036 | A1 | 12/2009 | Sahuguet | |

FOREIGN PATENT DOCUMENTS

| | | |
|---|---|---|
| GB | 2 346 697 A | 8/2000 |
| JP | 2005-280882 | 10/2005 |
| JP | 2005-280906 | 10/2005 |
| WO | 00/40496 | 7/2000 |
| WO | 01/83351 | 11/2001 |
| WO | 02/066357 | 8/2002 |
| WO | 2004/057361 | 7/2004 |
| WO | 2005/019084 | 3/2005 |
| WO | WO 2006/000618 A2 | 1/2006 |
| WO | 2006/095043 | 9/2006 |

OTHER PUBLICATIONS

Leontios J. Hadjileontiadis, "A New Concept in Increasing Elevator Functionality and Accessibility for Disabled People", Jul. 15, 2011, pp. 1-10, online source.

(Continued)

*Primary Examiner* — Thomas Black
*Assistant Examiner* — Luke Huynh
(74) *Attorney, Agent, or Firm* — Stroock & Stroock & Lavan LLP

(57) ABSTRACT

A visitor can receive guidance (e.g., movement directions) through a portable electronic device. The visitor can read an information-containing tag with the electronic device to input location information into the device. With the electronic device, the visitor can then select one or more destinations. The device then provides directions to the visitor for the one or more destinations.

18 Claims, 10 Drawing Sheets

(56) References Cited

OTHER PUBLICATIONS

European Search Report dated Jul. 25, 2011, issued in priority European Application No. 11160164.7.

Mulloni et al., 2009, "Indoor Positioning and Navigation with Camera Phones", IEEE, Pervasive Computing, pp. 22-31.

Hadijileontiadis, 2009, "A New Concept in Increasing Elevator Functionality and Accessibility for Disabled People", Lift Report, Issue Feb. 2009, RFID Technology and Elevator, pp. 1-10.

http://lighthousesignal.com/our-technology—"Lighthouse Signal Systems indoor location and positioning", pp. 1-3, 2013.

* cited by examiner

USER GUIDANCE WITH MOBILE ELECTRONIC DEVICES

CROSS-REFERENCE TO RELATED APPLICATION

This application claims priority to European Patent Application No. 11160164.7, filed Mar. 29, 2011, which is incorporated herein by reference.

FIELD

The present disclosure relates to technologies for guiding a user, for example at or in a building or other structure.

BACKGROUND

When a user visits a location (e.g., an unfamiliar building), directions provided by a machine can help the user reach a given destination. Directions personalized for one or more users are generally more helpful. Navigation devices relying on satellite data (e.g., Global Positioning System (GPS) devices) are sometimes not effective in locations where an adequate satellite signal cannot be received, including underground locations or locations in a building.

SUMMARY

A user can receive guidance (e.g., movement directions) through a portable electronic device. The user can read an information-containing tag with the electronic device to input location information into the device. With the electronic device, the user can then select one or more destinations. The device then provides directions to the user for the one or more destinations.

In some embodiments, an elevator installation user guidance method comprises: receiving location information from a portable electronic device at an area served by an elevator installation, the location information being based at least in part on data read from an optical code or a radio tag located at the area served by the elevator installation; receiving one or more user destinations from the portable electronic device; and transmitting user guidance information to the portable electronic device, the user guidance information being based at least in part on the location information and the one or more received user destinations. At least a portion of the user guidance information can be provided by an elevator control system. The method can further comprise authenticating the portable electronic device. The method can also comprise setting an elevator car arrival time based at least in part on the location information. Possible destination information can be transmitted to the portable electronic device, the received one or more user destinations being selected from one or more destinations described in the transmitted possible destination information. The user guidance information can comprise an elevator assignment. The transmitting and receiving can occur over the internet. The user guidance information can comprise a movement direction for the user.

In further embodiments, an elevator installation comprises: a location information tag comprising an optical code or a radio tag, the location information tag being positioned in an area served by the elevator installation; an elevator control system; and a server coupled to the elevator control system, wherein the server is configured to perform a method, the method comprising, receiving starting location information from a portable electronic device at the area served by the elevator installation, the starting location information being based at least in part on data read from the location information tag, receiving one or more user destinations from the portable electronic device, and transmitting guidance information to the portable electronic device, the guidance information being based at least in part on the starting location information and the one or more user destinations. In some embodiments, the area served by the elevator installation comprises a room, the location information tag being located in the room, the location information tag being one of a plurality of location information tags located in the room. The user guidance information can comprise an elevator assignment. The elevator assignment can be based at least in part on an identification of a user of the portable electronic device. The elevator installation can further comprise a transceiving means for sending a first set of data to the portable electronic device and receiving a second set of data from the portable electronic device.

Unless stated otherwise, the method acts disclosed herein can be performed by a processor executing instructions stored on one or more computer-readable storage media. The computer-readable storage media comprise, for example, one or more optical disks, volatile memory components (such as DRAM or SRAM), and/or nonvolatile memory components (such as hard drives, Flash RAM or ROM). The computer-readable storage media do not solely comprise transitory signals.

BRIEF DESCRIPTION OF THE DRAWINGS

Various embodiments of the disclosed technologies are further described below with reference to the following figures, in which.

DETAILED DESCRIPTION

The embodiments disclosed herein should not be construed as limiting in any way. Instead, the present disclosure is directed toward all novel and nonobvious features and aspects of the various disclosed methods and systems, and equivalents thereof, alone and in various combinations and subcombinations with one another. The methods disclosed herein are not performed purely in the human mind.

As used in this application and in the claims, the singular forms “a,” “an” and “the” include the plural forms unless the context clearly dictates otherwise. Additionally, the term "includes" means "comprises." When used in a sentence, the phrase "and/or" can mean "one or more of" the elements described in the sentence. Embodiments described herein are exemplary embodiments of the disclosed technologies unless clearly stated otherwise.

Although the operations of some of the disclosed methods and systems are described in a particular, sequential order for convenient presentation, it should be understood that this manner of description encompasses rearrangement, unless a particular ordering is required by specific language set forth herein. For example, operations described as occurring sequentially can in some cases be rearranged or performed concurrently.

For the sake of simplicity, the figures may not show the various ways in which the disclosed methods and systems can be used in conjunction with other methods and systems. Additionally, the description sometimes uses terms like "receive," "transmit" and "determine" to describe the disclosed technologies. These and other terms are high-level abstractions of the actual operations that are performed. The actual operations that correspond to these terms may vary depending on the particular implementation and are readily discernible by one of ordinary skill in the art.

Any of the methods, apparatus and systems described herein can be used with a wide variety of elevator installations and/or with a wide variety of structures. As used herein, the terms "user," "users," "visitor" or "visitors" can refer to humans, animals and/or machines. As used herein, a "visitor" is the same as a "user," unless explicitly stated otherwise.

Figure 1:
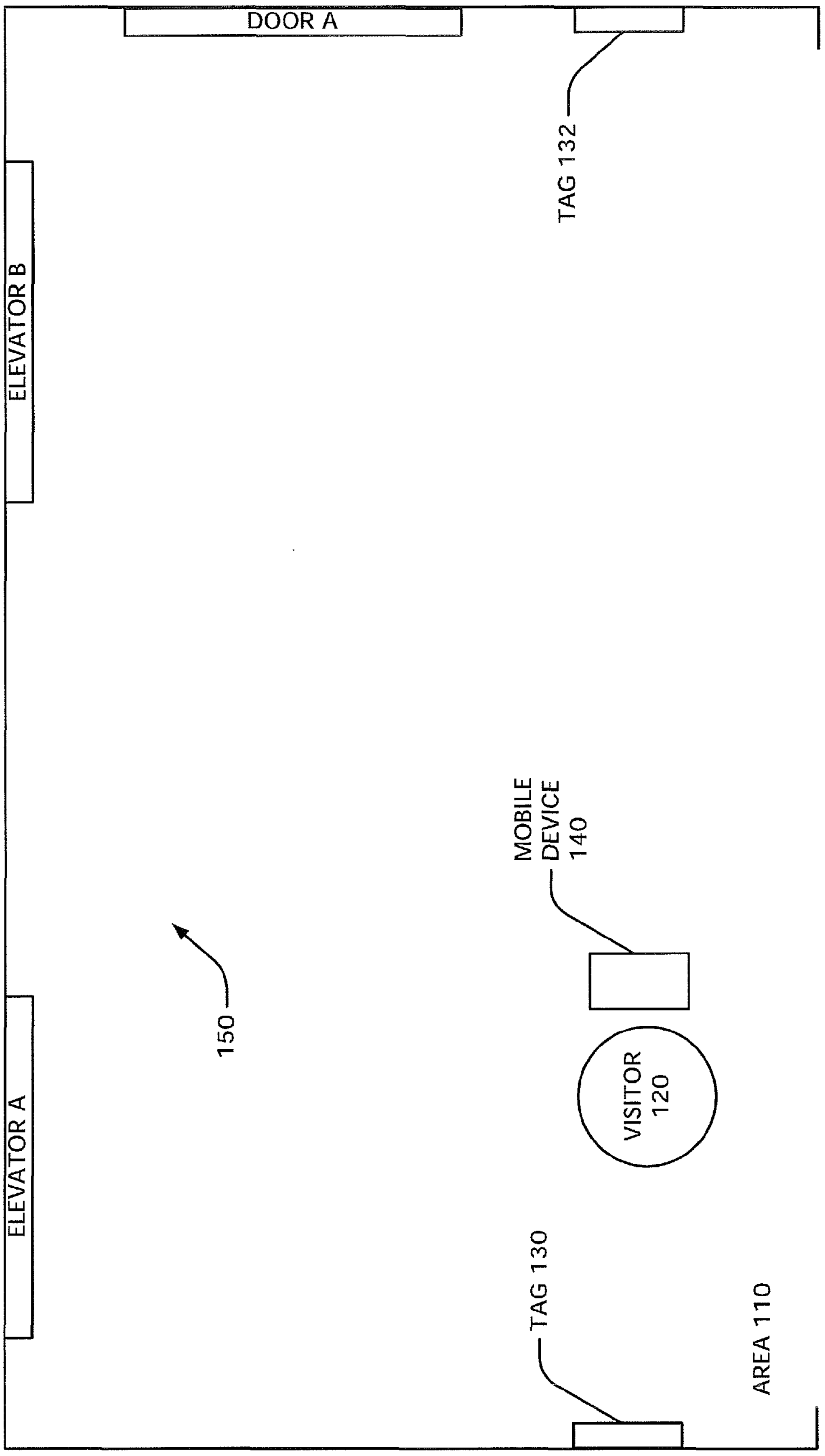
FIG. 1 shows a block-diagram plan view of an exemplary setting for using at least some embodiments of the disclosed technologies.

FIG. 1 shows a block-diagram plan view of an exemplary setting for using at least some embodiments of the disclosed technologies. An area 110 is at least partially accessible to a visitor 120 (including, possibly, multiple visitors). The visitor 120 may or may not be familiar with the area 110 and its surroundings. The area 110 can be in, at or near a building or other structure. For example, in various embodiments the area 110 can be a lobby in a building or parking garage, a subterranean area or structure, or an outdoor entrance area. In some cases, the visitor 120 needs authorization to enter the area 110.

In various embodiments, the area 110 provides access to one or more elevators, escalators, staircases, hallways, storage areas and/or doors, which can allow the visitor 120 to reach one or more other areas. For example, in the setting of FIG. 1 the area 110 offers possible access to elevator A, elevator B and door A. In this example, an elevator installation 150 comprises elevators A and B. The area 110 comprises one or more location tags 130, 132, embodiments of which are described below in more detail. Generally, the tags 130, 132 can be read by a mobile device 140 used by the visitor 120.

Figure 2:
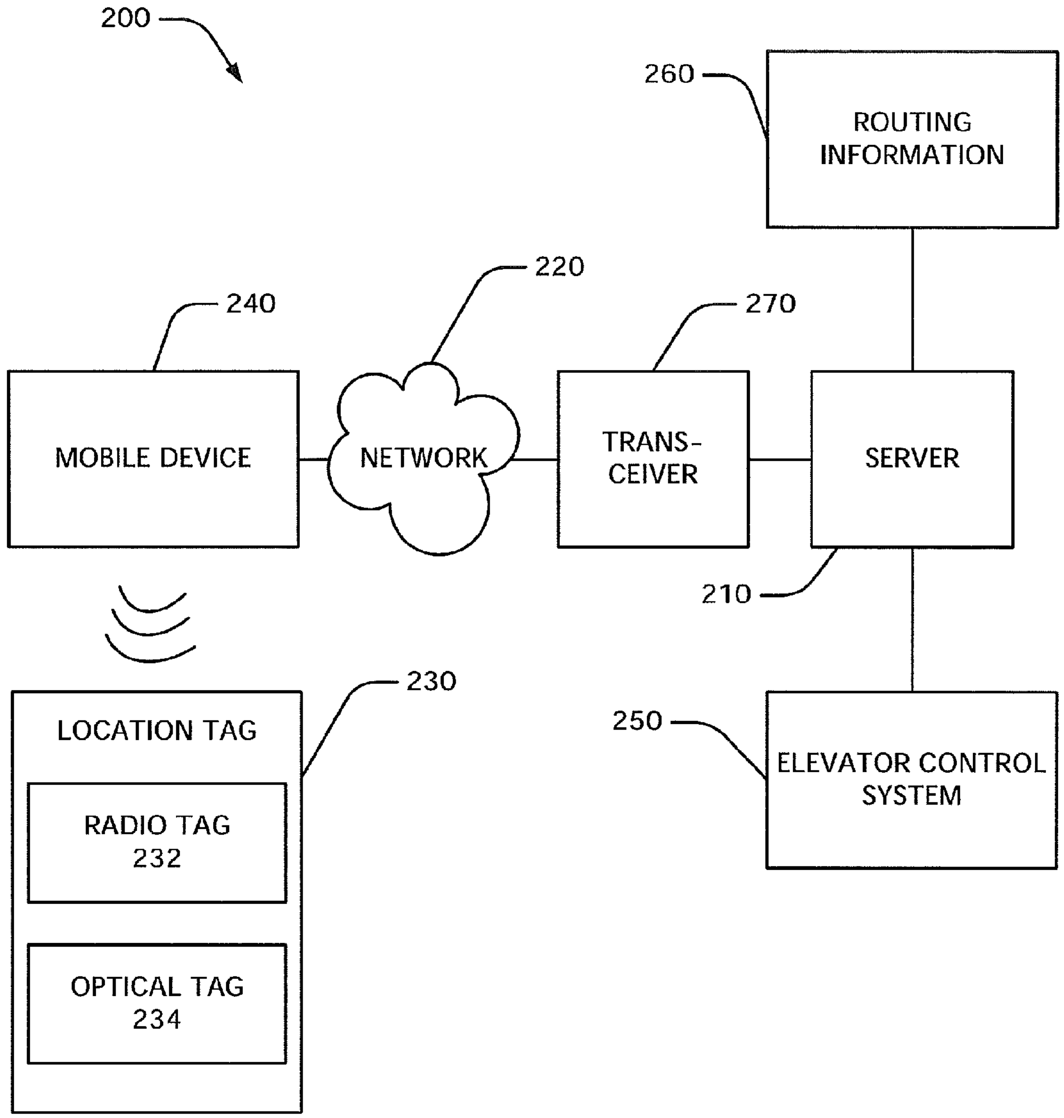
FIG. 2 shows a block diagram of an exemplary embodiment of a system for guiding one or more visitors.

FIG. 2 shows a block diagram of an exemplary embodiment of a system 200 for guiding one or more visitors. A mobile device 240 is used by the one or more visitors. Generally, the mobile device 240 comprises a portable electronic device configurable to execute one or more software programs, including software programs which cause the mobile device 240 to perform one or more method acts described herein. Examples of the mobile device 240 include handheld computers, smartphones, mobile telephones, tablet computers, laptop computers and PDAs. The mobile device 240 can read information from one or more location tags 230. The location tag 230 is located in an area (e.g., the area 110) and can be positioned on, for example, walls, floors, ceilings, signs and/or furniture pieces. Generally, encoded in the location tag 230 is location information that can be associated with a physical location at or near the actual physical location of the location tag 230.

In various embodiments, the location tag 230 comprises a radio tag 232 (e.g., a radio-frequency identification (RFID) tag), which stores at least a portion of the location information. The location information can be read from the radio tag 232 using one or more wireless communication technologies. For example, in various embodiments, near-field communication (NFC) technology or Bluetooth technology can be used to read information from the radio tag 232. In at least some embodiments, the mobile device 240 is configured to run one or more software applications as a result of reading the radio tag 232, including applications that cause the device 240 to perform one or more method acts described herein.

In further embodiments, the location tag 230 comprises an optical tag 234. The optical tag 234 stores at least a portion of the location information, which is encoded in a machine-readable optical representation. For example, the optical tag 234 can comprise a one-dimensional barcode and/or a two-dimensional code (e.g., a QR code, a Data Matrix code, and/or other code).

In some cases, a location tag 230 comprises both a radio tag 232 and an optical tag 234, potentially allowing the mobile device 240 to read location information from the location tag 230 in either or both formats. The radio tag 232 and the optical tag 234 can be mounted on a surface near each other or at least partially overlapping each other (e.g., partially overlapping or fully overlapping).

The system 200 further comprises a server 210, which comprises a computer programmed to perform one or more method acts described herein. The server 210 receives information from the mobile device 240 over a network 220. In various embodiments, the network 220 can use wired and/or wireless connections to the mobile device 240 and the server 210. In some embodiments, the server 210 connects to the network 220 through a transceiver 270. The transceiver comprises, for example, a radio system configured to transmit and receive information. In particular embodiments, the network 220 comprises a wireless network (e.g., wireless LAN, wireless Metropolitan Area Network, mobile device networks), a wired network (e.g., LAN), and/or the internet. In some cases, the server 210 is coupled to an elevator control system 250 (e.g., for a destination call control system) and/or one or more authorization systems (not shown). In some embodiments, the server 210 and the control system 250 are located in the same building as the location tag 230. In further embodiments, the server 210 and/or the control system 250 are in one or more other locations. The server 210 has access to routing information 260, which can be stored locally to and/or remotely from the server 210. The routing information 260 describes, for example, building layouts, possible destinations, walkway conditions and other information that may be useful in guiding a user to a particular location.

Figure 3:
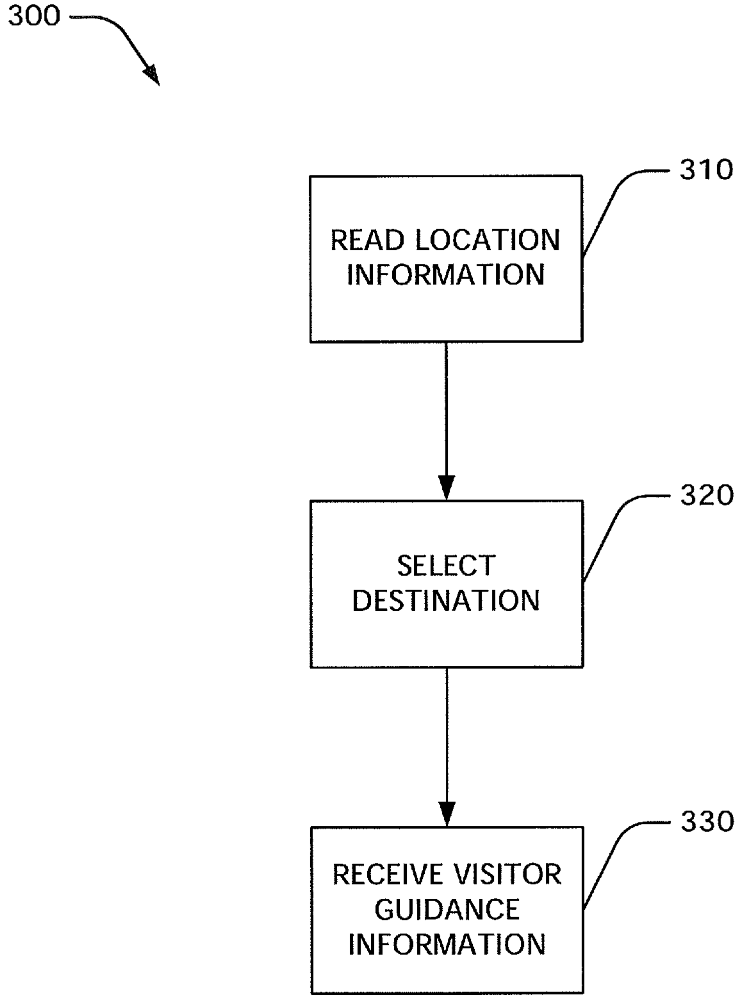
FIG. 3 shows a block diagram of an exemplary embodiment of a method for providing visitor guidance information.

FIG. 3 shows a block diagram of an exemplary embodiment of a method 300 for providing visitor guidance information. (The method 300 is discussed here in the context of the setting shown in FIG. 1, although its application is not limited to that particular setting.) In a method act 310, a visitor 120 uses a mobile device 140 to read location information from one or more tags 130, 132. In a method act 320, the visitor 120 selects one or more destinations using the mobile device 140. The destinations can include places in or near a building that can be accessed (directly or indirectly) from the area 110.

Figure 4A:
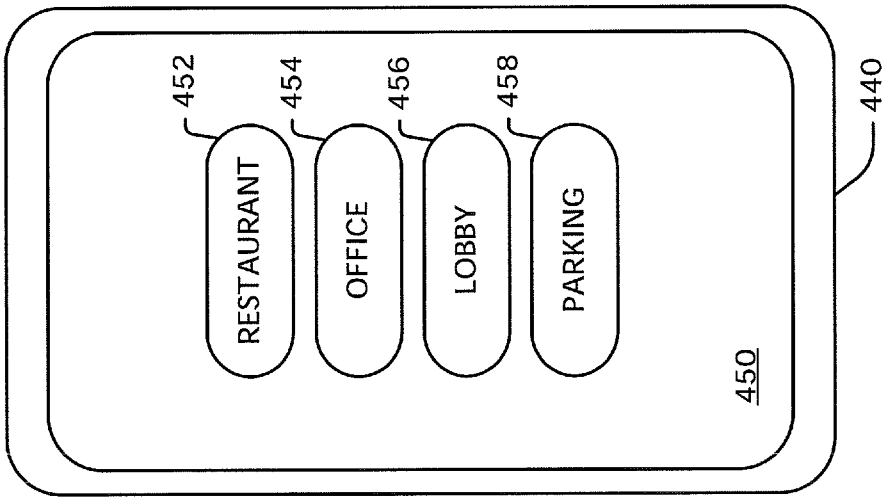
FIGS. 4A-4C show block diagrams of exemplary embodiments of user interfaces displayed on a mobile device.

FIG. 4A shows a block diagram of an exemplary embodiment of a mobile device 440 (e.g., a smartphone) displaying a user interface 450 that can be used to perform the method act 320. In this embodiment, possible destinations are shown on one or more buttons 452, 454, 456, 458. (Other user interfaces can also be used.) If the visitor 120 wishes to go to the restaurant, for example, the visitor can indicate this by selecting the button 452. In some embodiments, multiple destinations can be selected. Generally, the list of possible destinations will vary from location to location. In some cases, information regarding possible destinations is received by the mobile device 440 over a network (e.g., the network 220) after the device 440 reads the location information in the method act 310. In other cases, the information about possible destinations is pre-loaded onto the mobile device 440.

Figure 4B:
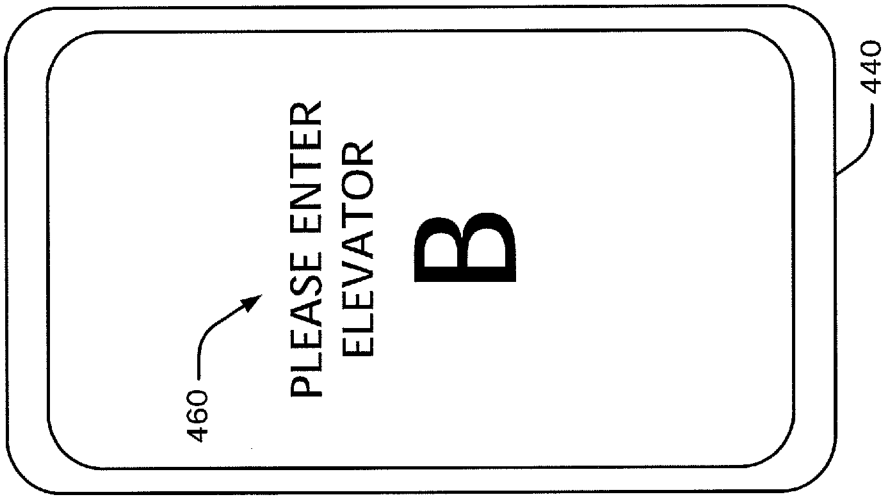
Figure 4C:
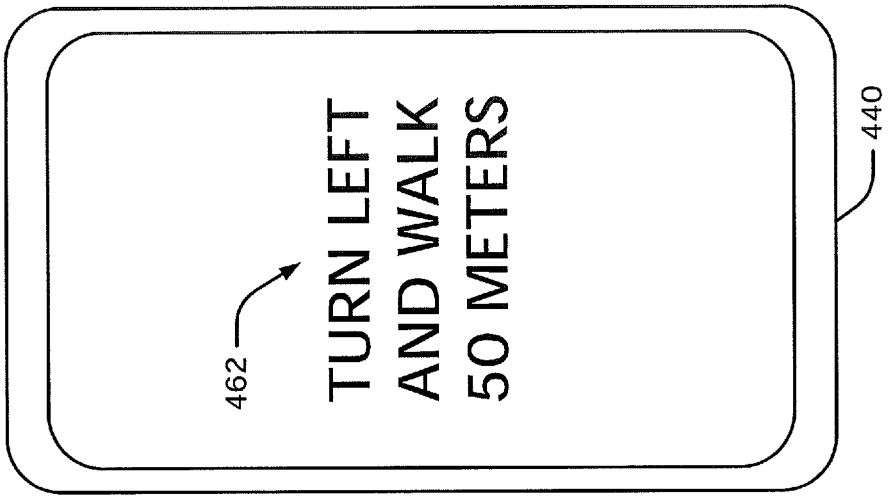

Returning to FIG. 3, the mobile device 140 receives direction information over a network connection in a method act 330. The direction information can comprise, for example, an assignment for an elevator or other device. FIG. 4B shows a block diagram of an exemplary embodiment of the mobile device 440 displaying an elevator assignment 460, "Please enter elevator B." The direction information is can also comprise, for example, a direction and/or distance describing how the visitor 120 should move. In further embodiments, the direction information comprises an estimated arrival time for the elevator. FIG. 4C shows a block diagram of an exemplary embodiment of the mobile device 440 displaying direction information 462, instructing the visitor 120 to "turn left and walk 50 meters." Further embodiments provide at least a portion of the direction information as one or more audio signals (e.g., speech). In further embodiments, the direction information comprises one or more instructions to enter a door, hallway, escalator and/or other area.

Figure 5:
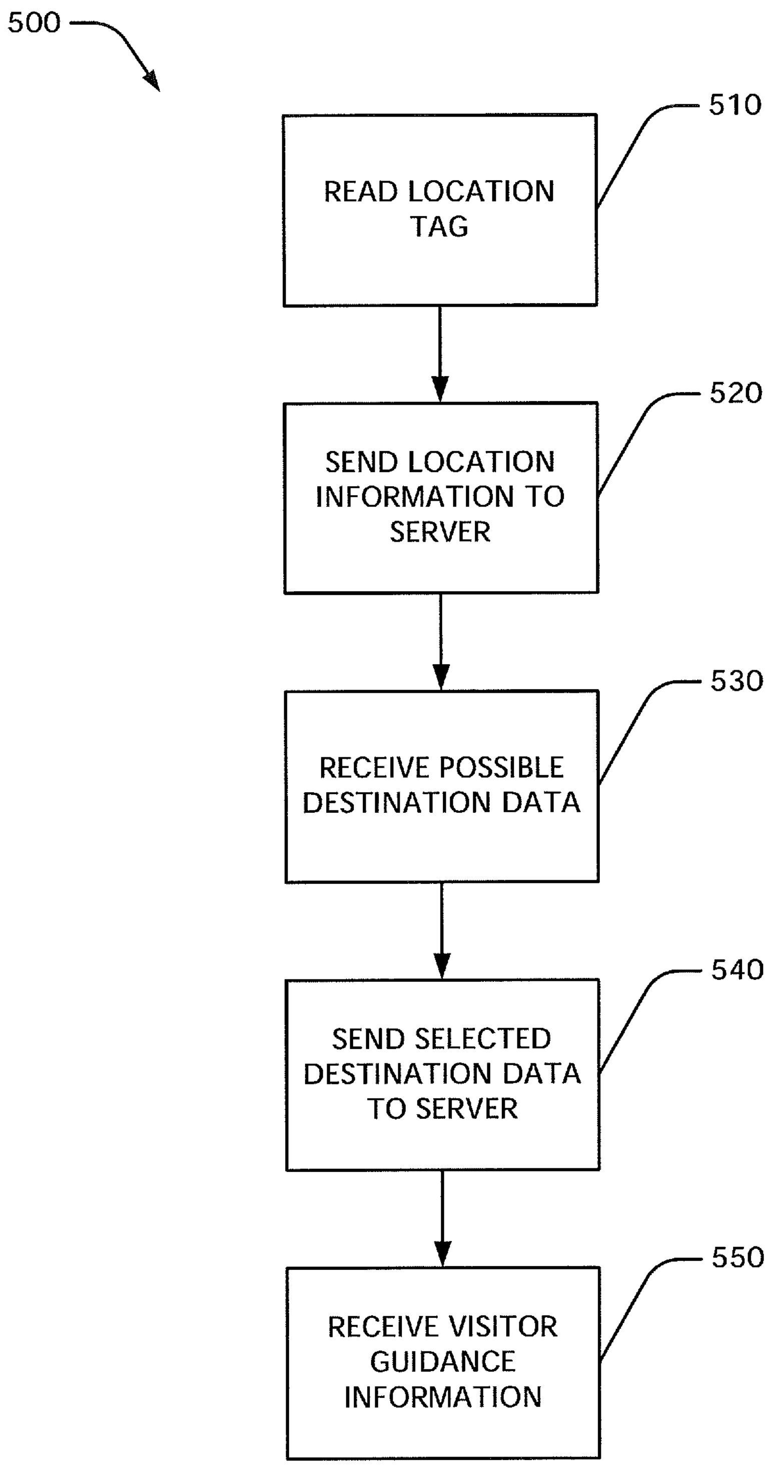
FIG. 5 shows a block diagram of an exemplary embodiment of a method for providing visitor guidance information.

FIG. 5 shows a block diagram of an exemplary embodiment of a method 500 for providing visitor guidance information. (The method 500 is discussed here in the context of the setting shown in FIG. 1 and in the context of system 200 of FIG. 2, although its application is not limited to those particular embodiments.) In a method act 510, the location tag 230 is read using the mobile device 240 to obtain location information. In a method act 520, the mobile device 240 sends the location information to the server 210 through the network 220. This can be done, for example, using an internet data connection accessible by the mobile device 240. In a method act 530, the mobile device 240 receives data describing one or more possible destinations for the visitor 120. In some embodiments, the possible destination data can be received from the server 210 through the network 220. In further embodiments, the possible destination data is retrieved from one or more computer-readable storage media accessible by the mobile device 240. In a method act 540, data regarding one or more selected destinations is sent to the server 210 through the network 220. In a method act 550, visitor guidance information is received by the mobile device 240 from the server 210 through the network 220.

Figure 6:
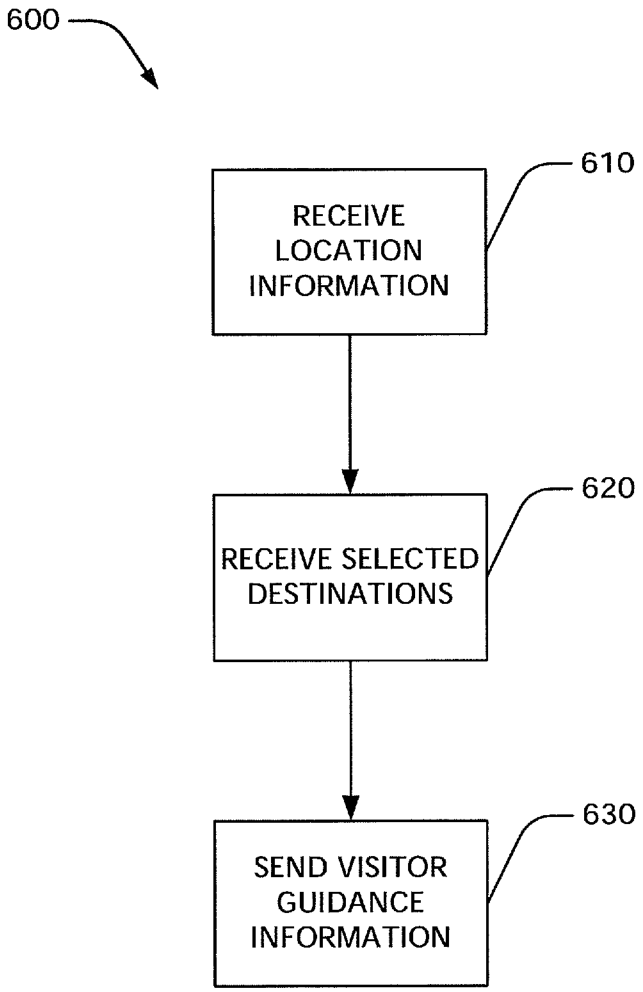
FIG. 6 shows a block diagram of an exemplary embodiment of a method for providing visitor guidance information.

FIG. 6 shows a block diagram of an exemplary embodiment of a method 600 for providing visitor guidance information. (The method 600 is discussed here in the context of system 200 of FIG. 2, although its application is not limited to that particular embodiment.) In a method act 610, location information is received by the server 210 from the mobile device 240 through the network 220. The location information was scanned from one or more location tags 230 by the mobile device 240. In a method act 620, the server 210 receives information about one or more selected destinations from the mobile device 240 through the network 220. In a method act 630, the server 210 sends visitor guidance information to the mobile device 240 through the network 220. The visitor guidance information is based at least in part on the starting location information and/or the information about the one or more selected destinations. It can also be based at least in part on the routing information 260.

Figure 7:
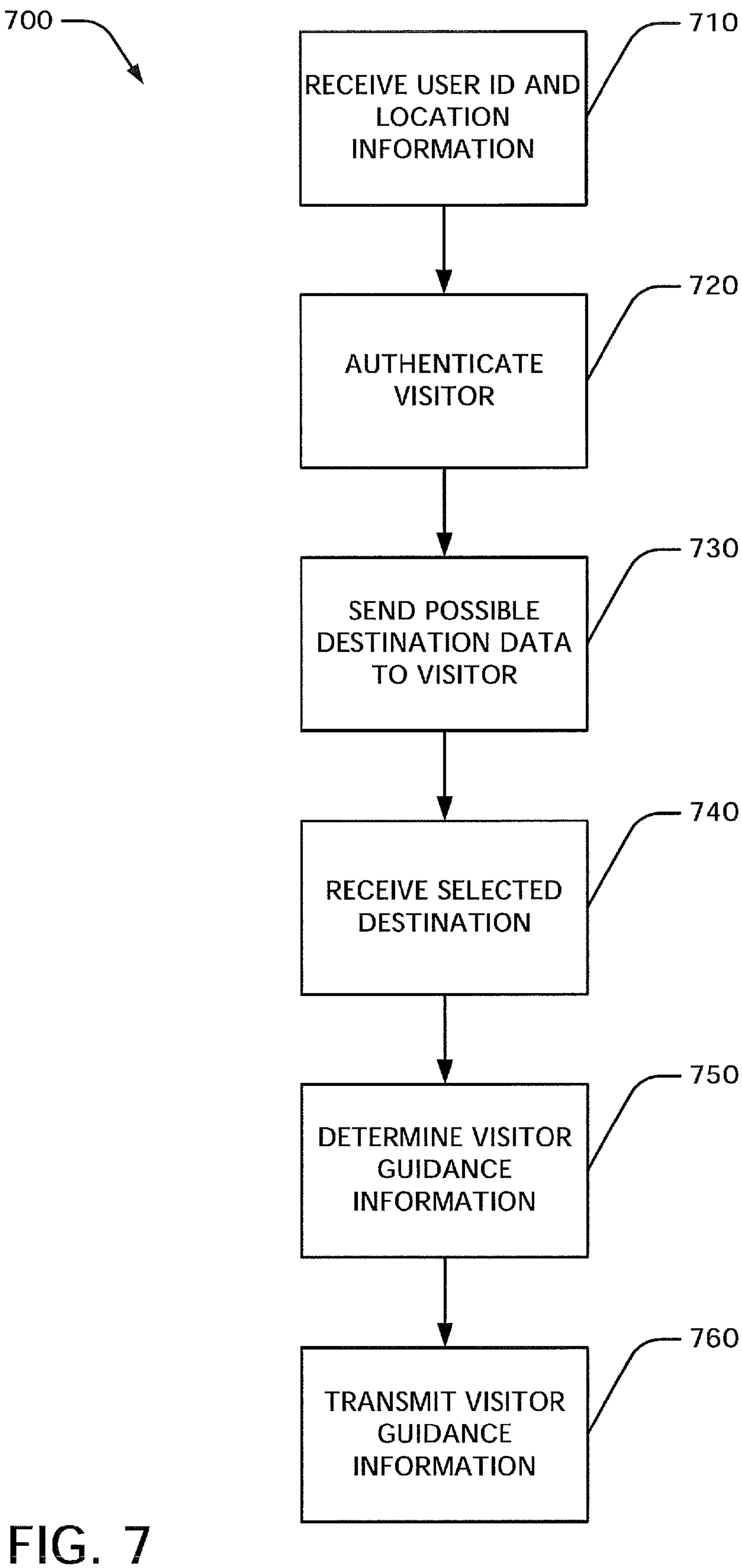
FIG. 7 shows a block diagram of an exemplary embodiment of a method for providing visitor guidance information.

FIG. 7 shows a block diagram of an exemplary embodiment of a method 700 for providing visitor guidance information. (The method 700 is discussed here in the context of system 200 of FIG. 2, although its application is not limited to that particular embodiment.) In a method act 710, the server 210 receives a user ID from the mobile device 240. The user ID identifies the mobile device 240 to the server 210. The server 210 also receives location information from the mobile device 240. The location information was scanned from one or more location tags 230 by the mobile device 240.

In some embodiments, the server 210 authenticates the visitor (e.g., the server 210 authenticates the visitor's mobile device 240) in a method act 720. The authentication can be based at least in part on a digital certificate, password and/or other information received by the server 210 from the mobile device 240. If the authentication shows that the mobile device 240 is not authorized to interact with the server 210, then the server rejects one or more requests from the mobile device 240. If the authentication shows that the mobile device 240 is authorized to interact with the server 210, then the server 210 sends data regarding one or more possible destinations to the mobile device 240 in a method act 730. The server 210 then receives information about the visitor's one or more selected destinations from the mobile device 240.

In a method act 750, the server 210 determines visitor guidance information. The visitor guidance information can be determined based at least in part on the location information and the one or more selected destinations. In further embodiments, the guidance information is determined in part according to a user profile that is associated with the user ID. For example, the user ID can be associated with one or more passengers who have particular needs to be accommodated by the guidance information, such as a VIP passenger or a passenger with a physical or mental handicap. The guidance information can comprise an elevator assignment for a destination call control system. The elevator assignment can be generated with the help of the elevator control system 250. In particular embodiments, features from one or more known elevator destination call control technologies can be used with the elevator assignment portion of the guidance information.

As described above, the guidance information can also comprise direction information and/or distance information.

In a method act 760, the server 210 sends the visitor guidance information to the mobile device 240.

Figure 8:
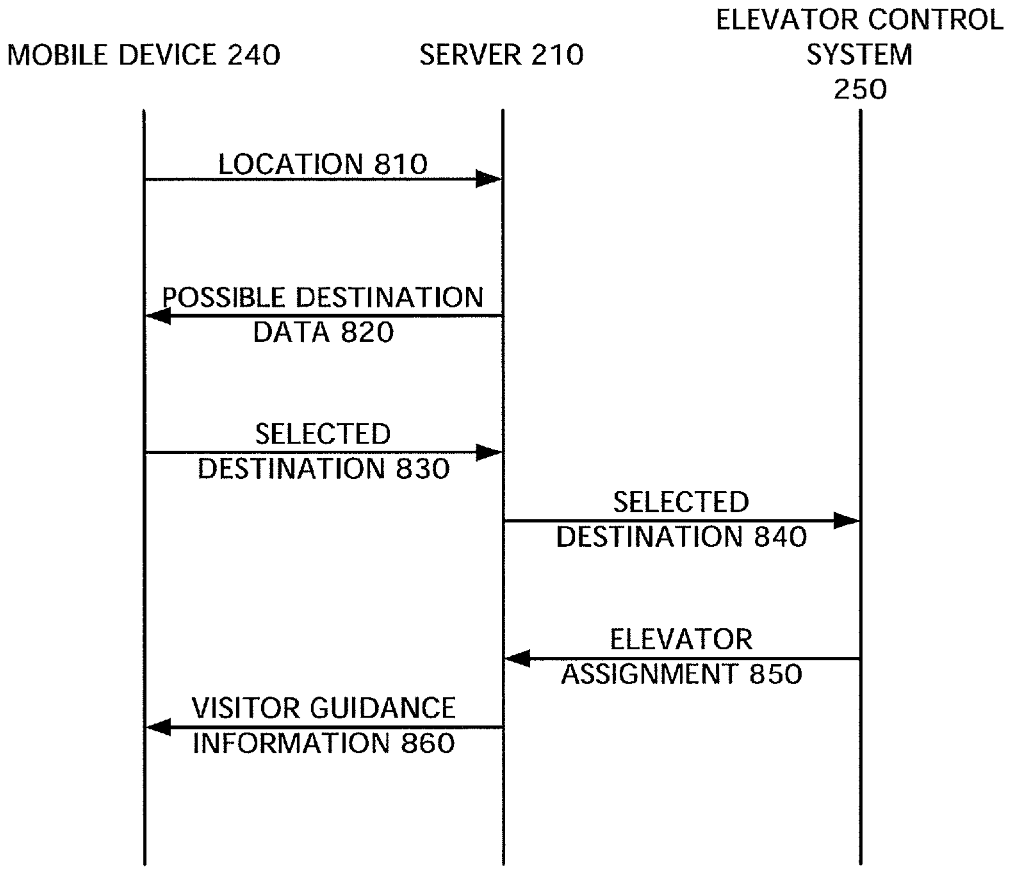
FIG. 8 shows an exemplary embodiment of an exchange of signals.

FIG. 8 shows a chart depicting one exemplary exchange of signals among the mobile device 240, the server 210 and the elevator control system 250. A signal 810 for location information is passed from the mobile device 240 to the server 210. A signal 820 for possible destination data is passed from the server 210 to the mobile device 240. A signal 830, indicating one or more selected destinations, is passed from the mobile device 240 to the server 210. A further signal 840 at least partially describing the one or more selected destinations is passed from the server 210 to the elevator control system 250. In response, the elevator control system sends the server 210 a signal 850 indicating an elevator assignment. The server 210 then sends a signal 860 to the mobile device 240 describing the visitor guidance information.

A non-limiting example scenario, employing one or more embodiments of the disclosed technologies, can be described with respect to FIG. 1. A visitor 120 arrives at the area 110 (in this scenario, a lobby) and, using a mobile device 140 (a mobile telephone, in this particular example), scans an optical code on the tag 130, which is mounted on a wall. To scan the code, the visitor 120 uses a special software application running on the device 140. Through a wireless internet connection, the device 140 passes a user ID (stored in the device 140) and location information (read from the tag 130) to a server (similar to the server 210), which in this example is at a remote location. The server verifies that the device 140 is authorized to receive information through the server. The server then sends a list of possible destinations to the device 140. After the device 140 receives the list of possible destinations and displays them to the visitor 120, the visitor 120 uses the device 140 to select the destination "Movie Theater." The device 140 transmits this destination to the server.

Working with an elevator control system (similar to the elevator control system 250), which is located in the same building as the area 110, the server determines an elevator call assignment for the visitor 120. In this case, the server recognizes that the visitor 120 scanned the tag 130 (rather than the tag 132), which is on the side of the area 110 closest to elevator A. As a result, the server and the elevator control system generate a call assignment for elevator A (rather than elevator B) for the visitor 120. The server and/or the elevator control system also determine when the elevator should arrive at the area 110. This determination is based on a known distance between the location of the tag 130 and the entrance to elevator A, and on an average walking speed. The call assignment is transmitted to the device 140 and displayed to the visitor 120.

After the user enters the elevator A, additional guidance information is sent to the device 140 to help the visitor reach the selected destination. For example, the additional guidance information can appear on the screen of the device 140 and instruct the visitor 120 to "go 10 meters left after exiting the elevator."

Accordingly, the visitor in this example scenario is able to easily receive personalized directions for finding his or her way in an unfamiliar place. The visitor is therefore more likely to arrive at a given destination easily and quickly. The server can also improve traffic flow in the building by directing visitors along selected routes.

Figure 9:
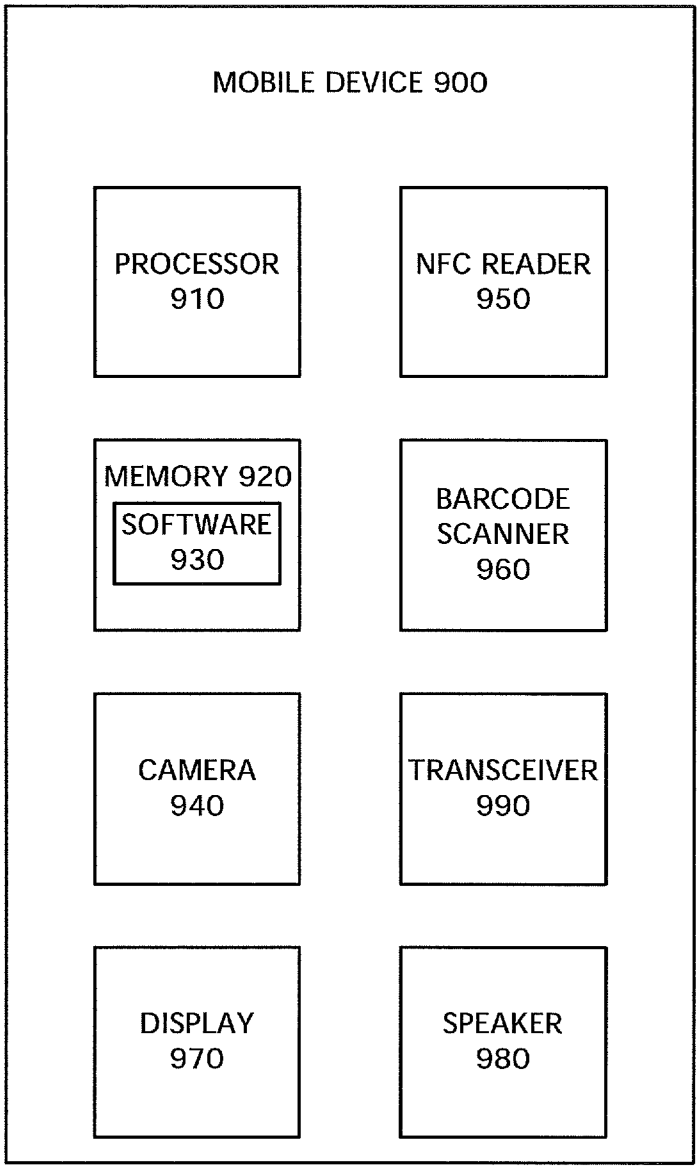
FIG. 9 shows a block diagram of an exemplary embodiment of a mobile device that can be used with one or more technologies disclosed herein.

FIG. 9 shows a block diagram of an exemplary embodiment of a mobile device 900 that can be used with one or more technologies disclosed herein. The mobile device 900 comprises components such as a processor 910. The processor 910 is coupled to a memory 920, which comprises one or more computer-readable storage media storing at least software instructions 930. When executed by the processor 910, the software instructions 930 cause the processor 910 to perform one or more method acts disclosed herein. The software instructions 930 can be loaded onto the mobile device 900 through a connection with another electronic device (e.g., a personal computer), through a connection to one or more computer-readable storage media (e.g., through a data storage card) and/or through a network connection (e.g., over the internet or a private network).

The mobile device 900 further comprises one or more input and/or output devices, such as a display 970 and an audio speaker 980. A transceiver 990 allows the device 900 to send and receive information with one or more networks (e.g., wireless networks, wired networks). The one or more networks can use various technologies, for example, wireless LAN, Bluetooth, UMTS, GSM, and/or others. The mobile device 900 also comprises one or more components for reading information (e.g., for reading tags like the tags 130, 132). For example, the mobile device 900 can comprise a camera 940, an NFC reader 950, and/or a barcode scanner 960.

Various embodiments of the mobile device 900 can omit one or more of the components shown in FIG. 9 and/or include additional components, including one or more further instances of any of the above components.

Figure 10:
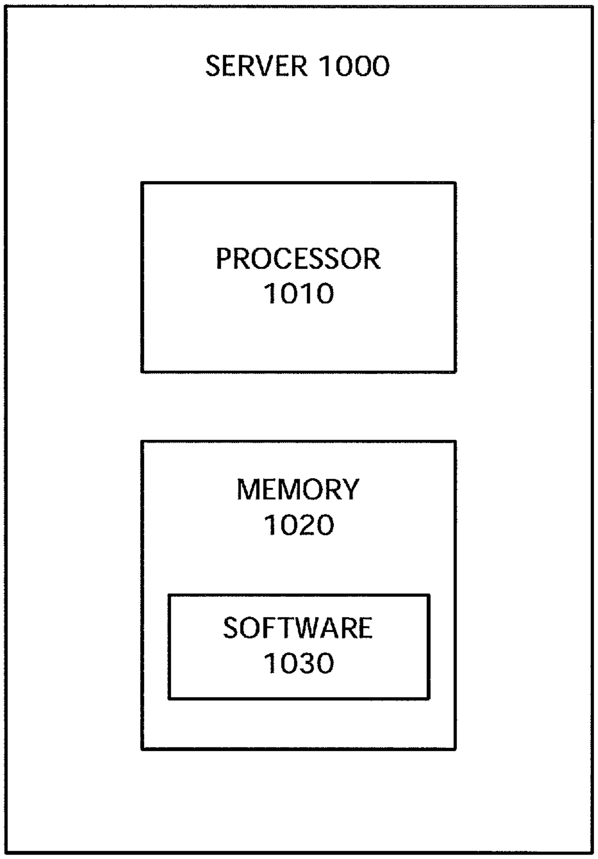
FIG. 10 shows a block diagram of an exemplary embodiment of a server that can be used with one or more technologies disclosed herein.

FIG. 10 shows a block diagram of an exemplary embodiment of a server 1000 that can be used with one or more technologies disclosed herein. The server comprises one or more processors 1010. The processor 1010 is coupled to a memory 1020, which comprises one or more computer-readable storage media storing software instructions 1030. When executed by the processor 1010, the is software instructions 1030 cause the processor 1010 to perform one or more method acts disclosed herein. Further embodiments of the server 1000 can comprise one or more additional components.

Any of the embodiments disclosed herein can be used with an authentication framework for mobile devices. For example, in the context of the system 200 of FIG. 2, the server 210 (or another component) can verify that the mobile device 240 is authorized to interact with the server 210. The authentication can be performed according to various protocols. For example, the authentication of the mobile device 240 can be performed according to the X.509 standard. The authentication can employ a signed identify certificate.

Having illustrated and described the principles of the disclosed technologies, it will be apparent to those skilled in the art that the disclosed embodiments can be modified in arrangement and detail without departing from such principles. It should be understood that features described with respect to one or more embodiments are also intended to be used with one or more other embodiments described herein, unless explicitly stated otherwise. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims. We therefore claim as our invention all that comes within the claims.

We claim:

1. An elevator installation user guidance method comprising:

receiving location information from a portable electronic device at an area served by an elevator installation, the location information being based at least in part on data read by the portable electronic device from an optical code or a radio tag located at the area served by the elevator installation;

receiving one or more user destinations from the portable electronic device;

transmitting user guidance information to the portable electronic device, the user guidance information being based at least in part on the location information and the one or more received user destinations; and transmitting possible destination information to the portable electronic device, the received one or more user destinations being selected from one or more destinations described in the transmitted possible destination information.

2. The user guidance method of claim 1, at least a portion of the user guidance information being provided by an elevator control system.

3. The user guidance method of claim 1, further comprising authenticating the portable electronic device.

4. The user guidance method of claim 1, wherein the transmitting and the receiving occur over the interne.

5. The user guidance method of claim 1, the user guidance information comprising a movement direction for a user.

6. The user guidance method of claim 1, the location information being based at least in part on data read from the optical code.

7. The user guidance method of claim 1, the location information being based at least in part on data read from the radio tag.

8. An elevator installation user guidance method comprising:

receiving location information from a portable electronic device at an area served by an elevator installation, the location information being based at least in part on data read by the portable electronic device from an optical code or a radio tag located at the area served by the elevator installation;

receiving one or more user destinations from the portable electronic device, transmitting user guidance information to the portable electronic device, the user guidance information being based at least in part on the location information and the one or more received user destinations; and setting an elevator car arrival time based at least in part on the location information.

9. The user guidance method of claim 8, further comprising transmitting possible destination information to the portable electronic device, the received one or more user destinations being selected from one or more destinations described in the transmitted possible destination information.

10. An elevator installation comprising:

a location information tag comprising an optical code or a radio tag, the location information tag being positioned in an area served by the elevator installation;

an elevator control system; and a computer coupled to the elevator control system, the computer being programmed to perform a method, the method comprising, receiving starting location information from a portable electronic device at the area served by the elevator installation, the starting location information being based at least in part on data read by the portable electronic device from the location information tag, receiving one or more user destinations from the portable electronic device, transmitting guidance information to the portable electronic device, the guidance information being based at least in part on the starting location information and the one or more user destinations; and transmitting possible destination information to the portable electronic device, the received one or more user destinations being selected from one or more destinations described in the transmitted possible destination information.

11. The elevator installation of claim 10, wherein the area served by the elevator installation comprises a room, the location information tag being located in the room, the location information tag being one of a plurality of location information tags located in the room.

12. The elevator installation of claim 11, the user guidance information comprising an elevator assignment.

13. The elevator installation of claim 12, wherein the elevator assignment is based at least in part on an identification of a user of the portable electronic device.

14. The elevator installation of claim 11, further comprising a transceiver configured to send a first set of data to the portable electronic device and to receive a second set of data from the portable electronic device.

15. One or more non-transitory computer-readable storage media having encoded thereon instructions that, when executed by a mobile electronic device, cause the mobile electronic device to perform a method, the method comprising:

reading information from an optical code or from a radio tag, the optical code or the radio tag being located at an area served by an elevator installation;

sending location information to the elevator installation, the location information being based on the information read from the optical code or from the radio tag;

receiving possible destination information from the elevator installation, sending destination information to the elevator installation, the destination information being selected from one or more user destinations described in the received possible destination information; and receiving from the elevator installation guidance information based on the location information and the destination information.

16. One or more non-transitory computer-readable storage media having encoded thereon instructions that, when executed by a processor, cause the processor to perform a method, the method comprising:

receiving starting location information from a portable electronic device at an area served by an elevator installation, the starting location information being based at least in part on data read by the portable electronic device from a location information tag at the area;

receiving an indication of one or more user destinations from the portable electronic device;

transmitting guidance information to the portable electronic device, the guidance information being based at least in part on the starting location information and the one or more user destinations and sending to the portable electronic device a description of possible destinations reachable from the area served by the elevator installation.

17. The one or more non-transitory computer-readable storage media of claim 16, the method further comprising sending at least one instruction to an elevator control system based on the one or more user destinations.

18. The one or more non-transitory computer-readable storage media of claim 16, the location information tag comprising a radio tag and an optical code.

* * * * *